United States Patent [19]

Honda et al.

[11] Patent Number: 5,580,676
[45] Date of Patent: Dec. 3, 1996

[54] RECTANGULAR BATTERY

[75] Inventors: Takeshi Honda; Ryoichi Yamane, both of Tokyo, Japan

[73] Assignee: Sony Corporation, Tokyo, Japan

[21] Appl. No.: 526,199

[22] Filed: Sep. 11, 1995

Related U.S. Application Data

[63] Continuation of Ser. No. 290,103, Aug. 15, 1994, abandoned.

[30] Foreign Application Priority Data

Aug. 17, 1993 [JP] Japan ................................ 5-203137

[51] Int. Cl.6 ............................... H01M 2/18; H01M 2/16
[52] U.S. Cl. ..................... 429/131; 429/136; 429/128; 429/129; 429/139
[58] Field of Search .................... 429/94, 128, 129, 429/131, 136, 139, 162

[56] References Cited

U.S. PATENT DOCUMENTS

| | | | |
|---|---|---|---|
| 2,851,509 | 9/1958 | Di Pasquale et al. | 429/136 |
| 3,216,859 | 11/1965 | Duncan | 429/139 |
| 3,442,717 | 5/1969 | Horn et al. | 429/139 |
| 4,215,186 | 7/1980 | Jaeger | 429/139 |
| 4,396,691 | 8/1983 | Wheadon | 429/139 |
| 4,761,352 | 8/1988 | Bakos et al. | 429/136 |

FOREIGN PATENT DOCUMENTS 0136886  4/1985  European Pat. Off. .

Primary Examiner—Prince Willis, Jr.
Assistant Examiner—Carol Chaney
Attorney, Agent, or Firm—Hill, Steadman & Simpson

[57] ABSTRACT

A rectangular battery is disclosed. The rectangular battery includes a plurality of cathode plates and anode plates alternately superposed via a separator to face each other. The cathode plates and the anode plates are consecutively packed with the separator, the packed cathode plates or anode plates being folded at a separator fusing portion between the cathode plates or anode plates.

12 Claims, 12 Drawing Sheets

5,580,676

RECTANGULAR BATTERY

This is a continuation of application Ser. No. 08/290,103, filed Aug. 15, 1994, and now abandoned.

BACKGROUND OF THE INVENTION

This invention relates to a rectangular battery, and particularly to an improvement of the battery structure thereof.

The rectangular battery employed in such a device as a video camera has a structure in which cathode plates 101 and anode plates 102 are packed with separators 103 and alternately superposed, as shown in FIG. 1.

The layered product formed by these cathode plates 101, anode plates 102 and separators 103 is inserted into a rectangular battery casing having one side open, and then a liquid electrolyte is filled therein, to serve as a battery as a whole.

The cathode plate 101 is formed of a thin aluminum foil having both sides coated with a mixed cathode agent containing lithium. On the other hand, the anode plate 102 is formed of a thin copper film having both sides coated with a mixed anode agent containing carbon.

It is a conventional practice to sandwich the plural cathode plates 101 or anode plates 102 arrayed at predetermined intervals, with the pair of separators 103 in the direction of the thickness of the plates, as shown in FIG. 2, and then to bond portions between the electrode plates by heat melting so as to pack the plates. FIG. 2 shows only the case in which the cathode plates 101 are packed.

The heat melting is carried out by pressing with a temperature-controlled heater block. The packed electrode plates are separated at the fusing portions, as shown in FIG. 3, and the cathode plates 101 and the anode plates 102 are alternately superposed, as shown in FIG. 1.

However, since the separator 103 is excessively melted by heat propagation due to the heater block which presses the separator 103, the fusing portions need to be wider. For this reason, the electrode plates must be narrowed by the wider fusing portions, consequently reducing the battery capacity.

After the heat melting, the separator 103 may be crumpled by its contraction due to heat. This may conceivably cause deterioration in performance of the battery. Also, as a cutter is used to separate the electrode plates at the fusing portions, the fusing portion must be positioned correctly for each of the electrode plates. This raises a considerable problem in productivity.

OBJECT AND SUMMARY OF THE INVENTION

In view of the above-described status of the art, it is an object of the present invention to provide a rectangular battery in which electrode plates packed with separators can be used continuously and in which the fusing portions can be easily cut to separate the electrode plates required for one battery, for achieving satisfactory productivity.

According to the present invention, there is provided a rectangular battery including: a plurality of cathode plates and anode plates alternately superposed via a separator to face each other; at least the cathode plates or the anode plates being consecutively, enveloped by or packed between two separators the packed cathode plates or anode plates being folded at a separator fusing portion between the cathode plates or anode plates.

In the rectangular battery, the plurality of cathode plates are sandwiched by two sheet-like separators, each of the cathode plates being packed by fusing the separators along outer periphery of the cathode plates, the cathode plates being folded alternately with the anode plates at fusing portions thereof.

The anode plates are formed continuously in an accordion form.

In the rectangular battery as described above, the anode plates are sandwiched by two sheet-like separators, each of the anode plates being packed by fusing the separators along outer periphery of the anode plates.

In the rectangular battery as described above, the plurality of cathode plates are sandwiched by a wide sheet-like double-folded separator, each of the cathode plates being packed by fusing the separator along outer periphery of the cathode plates, the cathode plates being folded alternately with the anode plates at fusing portions thereof.

Also, the fusing portion is bonded by ultrasonic bonding.

The fusing portion is bonded by ultrasonic bonding at 40 kHz, 15 W.

The cathode plate is formed by an aluminum foil having both or one side thereof coated with a mixed cathode agent and dried.

The anode plate is formed by a copper foil having both or one side thereof coated with a mixed anode agent and dried.

The separator is composed of a polymeric material having minute pores.

In addition, the polymeric material is selected from polypropylene and polyethylene.

Since the rectangular battery of the present invention has at least the cathode plates or the anode plates respectively packed with the separator, intrusion of powder of the cathode plate and the anode plate into each other is prevented for avoiding the deterioration in performance.

In addition, since the rectangular battery of the present invention has the electrode plates packed with the separator with the fusing portion between the plates being processed by ultrasonic bonding, the fusing portion is processed to be extremely thin so that the electrode plates can be easily separated simply by stretching.

DETAILED DESCRIPTION OF PREFERRED EMBODIMENTS

Preferred embodiments of the present invention will now be described in detail with reference to the accompanying drawings.

Embodiment 1

Figure 6:
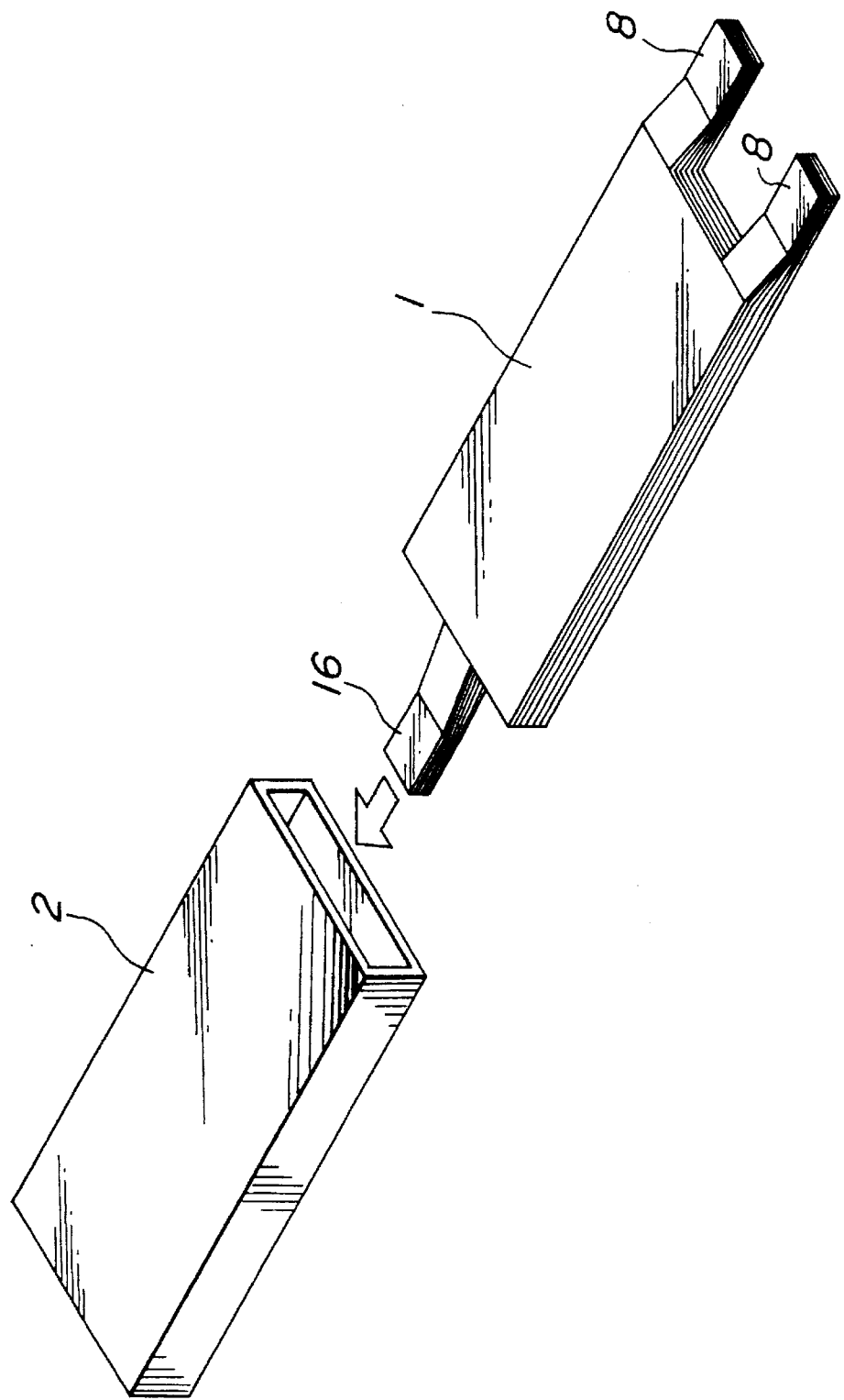
FIG. 6 is an exploded perspective view showing an example of the rectangular battery of Embodiment 1.

As shown in FIG. 6 a rectangular battery of the present embodiment is formed by inserting an electrode group 1 formed at alternately stacked cathode plates and anode plates as described below into a battery casing 2, and then filling a liquid electrolyte therein.

The battery casing 2 shown in FIG. 6 is formed as a rectangular casing of Fe with Ni plating thereon, having one side open.

Figure 1:
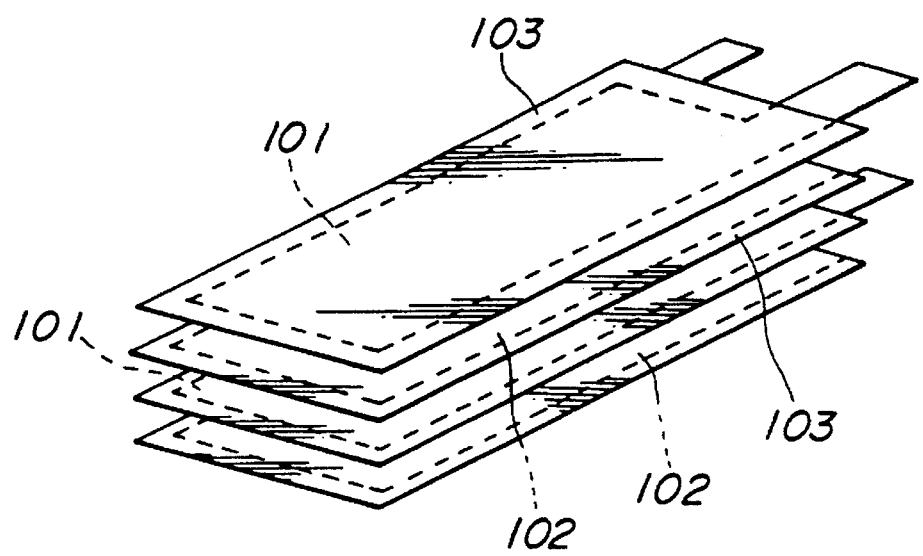
FIG. 1 is a perspective view showing a state in which packed cathode and anode plates are alternately stacked in a conventional rectangular battery.
Figure 2:
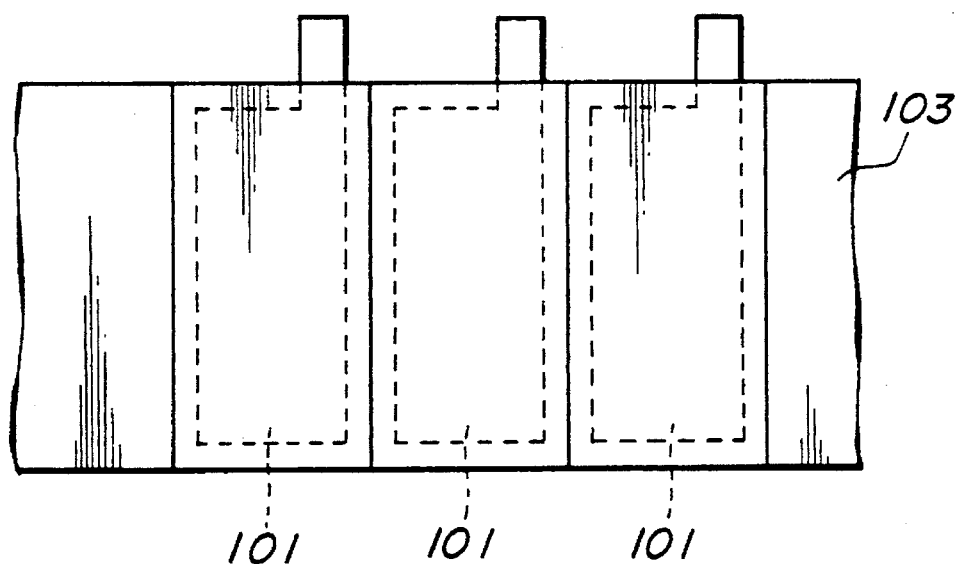
FIG. 2 is a plan view showing a state in which the electrode plates are packed with a separator in the conventional rectangular battery.
Figure 3:
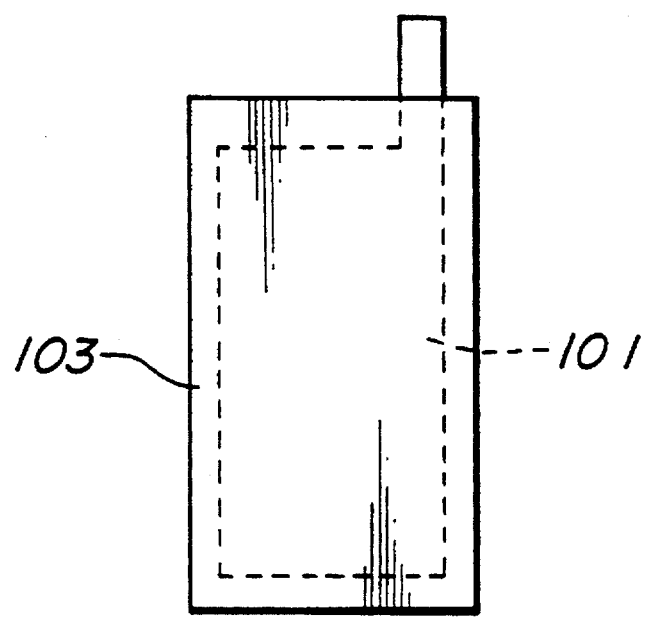
FIG. 3 is a plan view showing a state in which the packed electrode plates are separated in the conventional rectangular battery.
Figure 4:
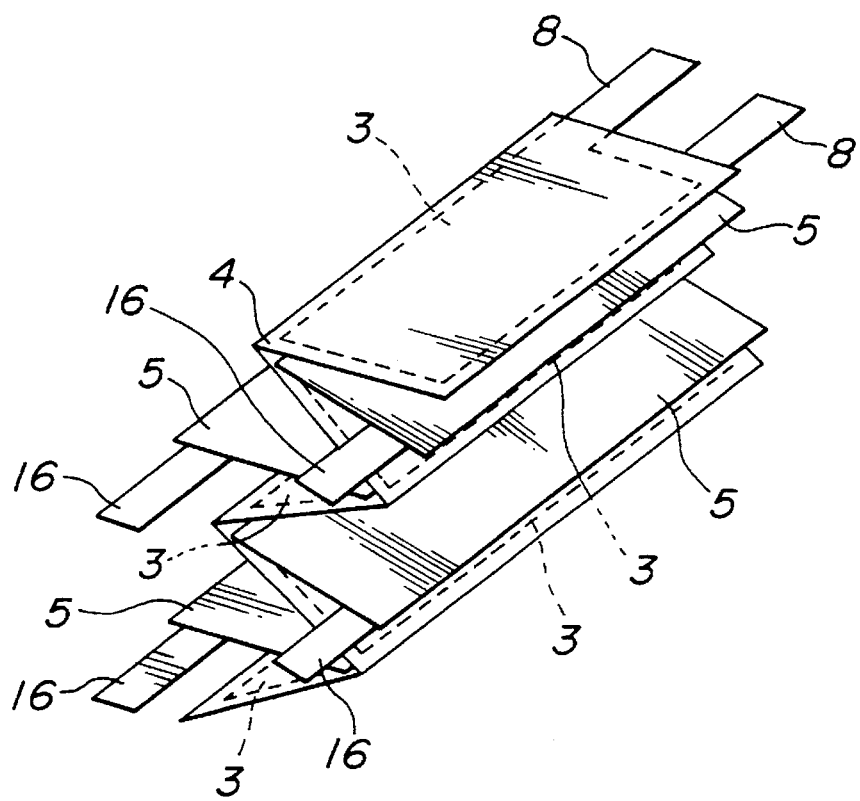
FIG. 4 is a perspective view showing a state prior to folding of an electrode group in a rectangular battery of Embodiment 1.
Figure 5:
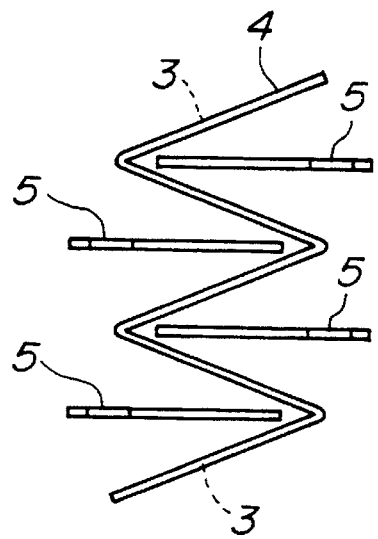
FIG. 5 is a side view showing a state prior to the folding of the electrode group in the rectangular battery of Embodiment 1.

The electrode group 1 is formed by packing each of plural cathode plates 3 with a separator 4 as a sheet, folding the sheet in accordion form, inserting anode plates 5 into folded portions, and then stacking the electrode plates so as to alternately superpose them, as shown in FIGS. 4 and 5. Leads 8, 16 of the cathode plate 3 and the anode plate 5 are bonded after the stacking, as shown in FIG. 6.

Figure 7:
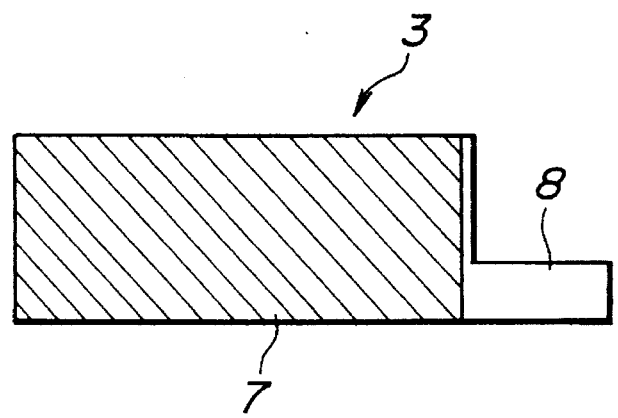
FIG. 7 is a plan view showing an example of a cathode plate in the rectangular battery of Embodiment 1.
Figure 8:
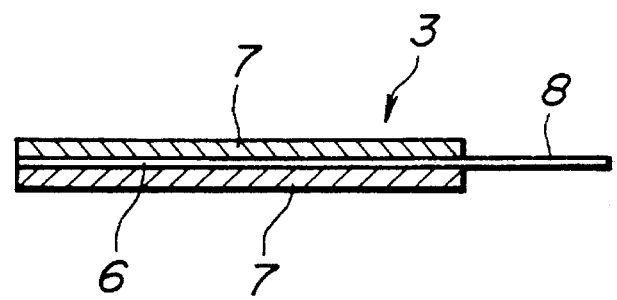
FIG. 8 is a cross-sectional view showing the cathode plate in the rectangular battery of Embodiment 1.
Figure 9:
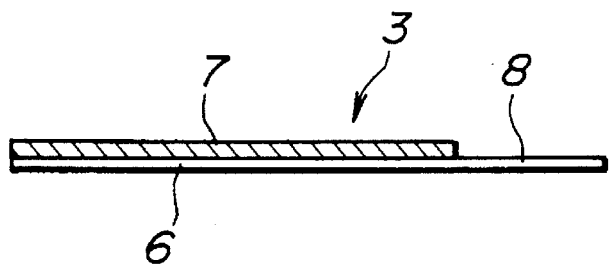
FIG. 9 is a cross-sectional view showing another example of the cathode plate in the rectangular battery of Embodiment 1.

The cathode plate 3 is formed by coating one or both sides of a plane, substantially rectangular sheet-like aluminum foil 6 with a mixed cathode agent 7, and then drying and pressing the resulting product, as shown in FIGS. 7, 8 and 9. As the mixed cathode agent 7, a mixture of $LiCoO_2$ powder as an active cathode agent, carbon powder as a conductive agent and PVDF as a binder can be used. It is to be noted that the lead 8 is not coated with the mixed cathode agent 7.

In the present embodiment, the aluminum foil 6 is 20 μm in thickness, and the pressed cathode plate is as a whole 150 μm in thickness.

The separator 4, separating the cathode plate 3 from the anode plate 5, is formed of a porous polymeric material having holes, submicron to several μm diameter, opened therein for passing ions. A sheet-like film of polypropylene (PP) or polyethylene (PE) is used for the separator 4.

Figure 10:
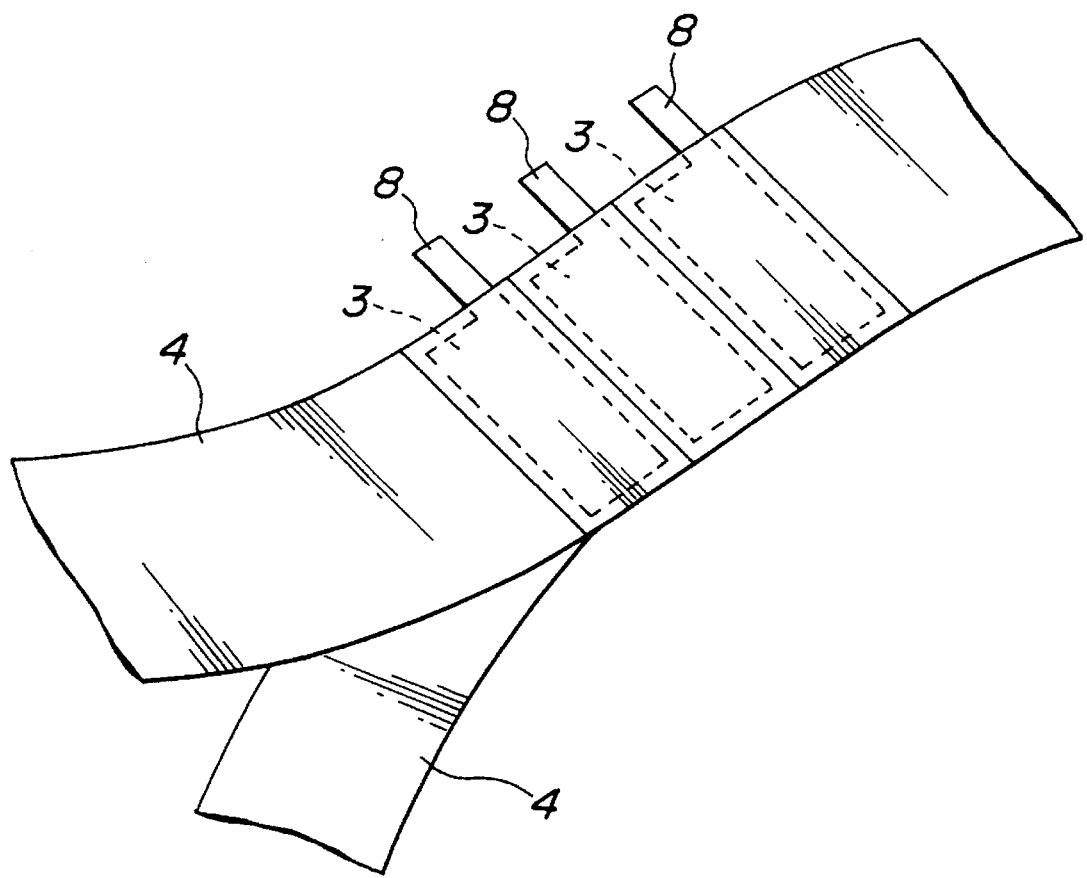
FIG. 10 is a perspective view showing a state in which the cathode plate is sandwiched by a pair of separators in the rectangular battery of Embodiment 1.
Figure 11:
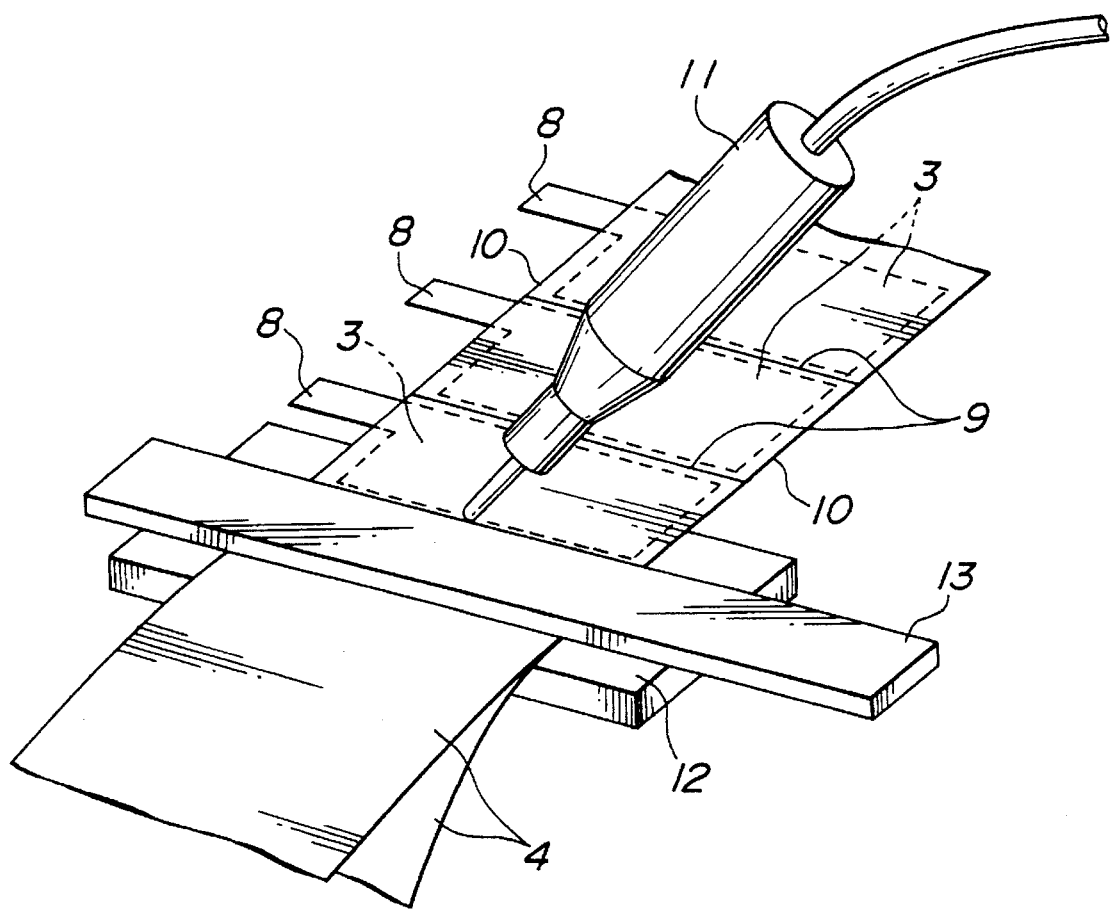
FIG. 11 is a perspective view showing a state in which the separators are ultrasonic-bonded after the cathode plate is packed with the separators in the rectangular battery of Embodiment 1.

The cathode plates 3 are arrayed at predetermined intervals between a pair of sheet-like separators 4, as shown in FIG. 10, and are packed therein by ultrasonic bonding inter-electrode plate portions 9 and rim portions 10 on both longitudinal sides by an ultrasonic welder 11, as shown in FIG. 11. Each of the cathode plates 3 arrayed at the predetermined intervals is packed with the separators, and the packed cathode plates 3 form a so-called hoop in which the cathode plates are continuously connected.

In packing the cathode plates 3 with the separators 4, the cathode plates 3 are arrayed so that at least the leads 8 extend out of the separators 4. The bonding portion is set on a pad 12 so as to be bonded, with the separators 4 pressed by an ultrasonic head guide plate 13.

By the ultrasonic bonding, it is possible to bond the bonding portion with a small bonding width, and hence to have a large electrode width. Consequently, an increase in battery capacity can be achieved. Also, since a fusing portion of the separator 4 is processed to be extremely thin by the ultrasonic bonding, the electrode plates can be easily separated by stretching the separator in any direction. Thus, such a separator 4 is effective for separating the electrodes of the number required for one battery.

In the present embodiment, the ultrasonic welding is carried out at 40 kHz, 15 W. The rim portions 10 on both longitudinal sides of the separator 4 may be bonded by heat melting using a heater block, as the rim portions 10 need not be separated.

If the electrode plates are packed with the separators 4 as described above, powder of the mixed cathode agent falling off the electrode, if any, does not intrude into the anode 5. Consequently, deterioration in performance due to the intrusion of the mixed agent can be assuredly prevented. Also, since the electrode plates are not separated but form the hoop, satisfactory convenience in handling and productivity can be achieved.

Figure 12:
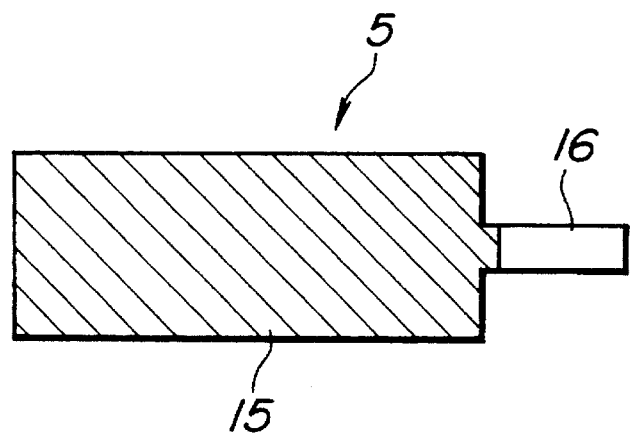
FIG. 12 is a plan view showing an example of an anode plate in the rectangular battery of Embodiment 1.
Figure 13:
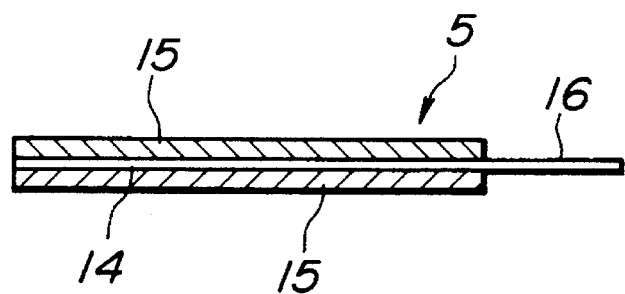
FIG. 13 is a cross-sectional view showing the anode plate in the rectangular battery of Embodiment 1.
Figure 14:
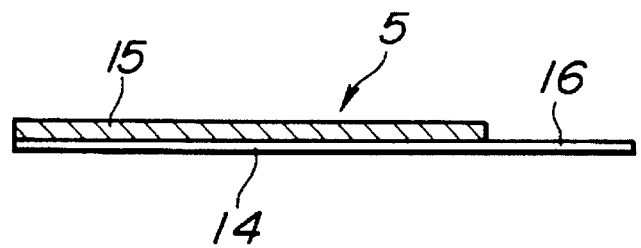
FIG. 14 is a cross-sectional view showing another example of the anode plate in the rectangular battery of Embodiment 1.

The anode plate 5 is formed by coating one or both sides of a plane, substantially rectangular sheet-like copper foil 14 with a mixed anode agent 15, and then drying and pressing the resulting product, as shown in FIGS. 12, 13 and 14. As the mixed anode agent 15, a mixture of carbon powder as an active node material and PVDF as a binder is used. It is to be noted that the lead 16 is not coated with the mixed anode agent 15.

In the present embodiment, the copper foil 14 is 20 μm in thickness, and the pressed anode is as a whole 180 μm in thickness.

Figure 15:
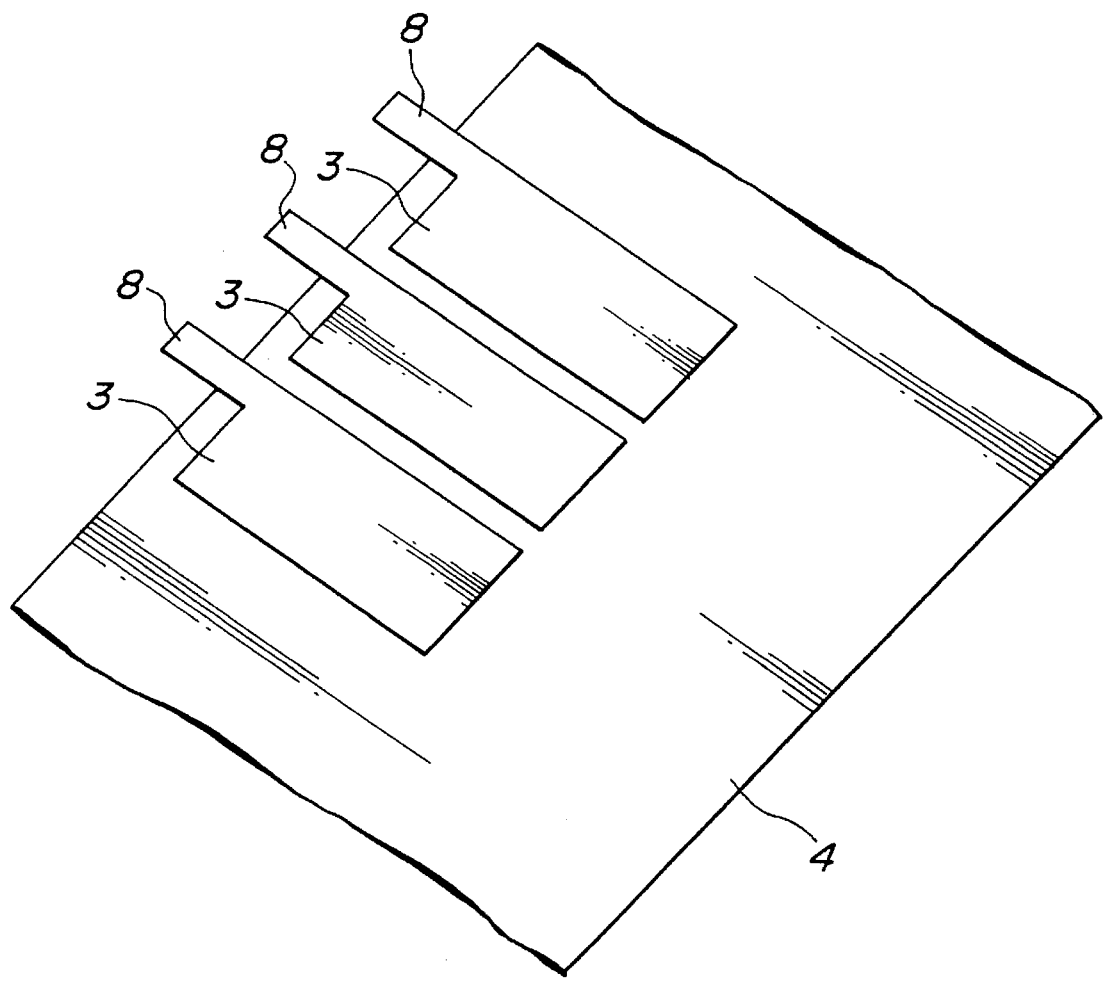
FIG. 15 is a perspective view showing an example of packing the cathode plates with one separator, in which the cathode plates are arrayed on a wide separator.
Figure 16:
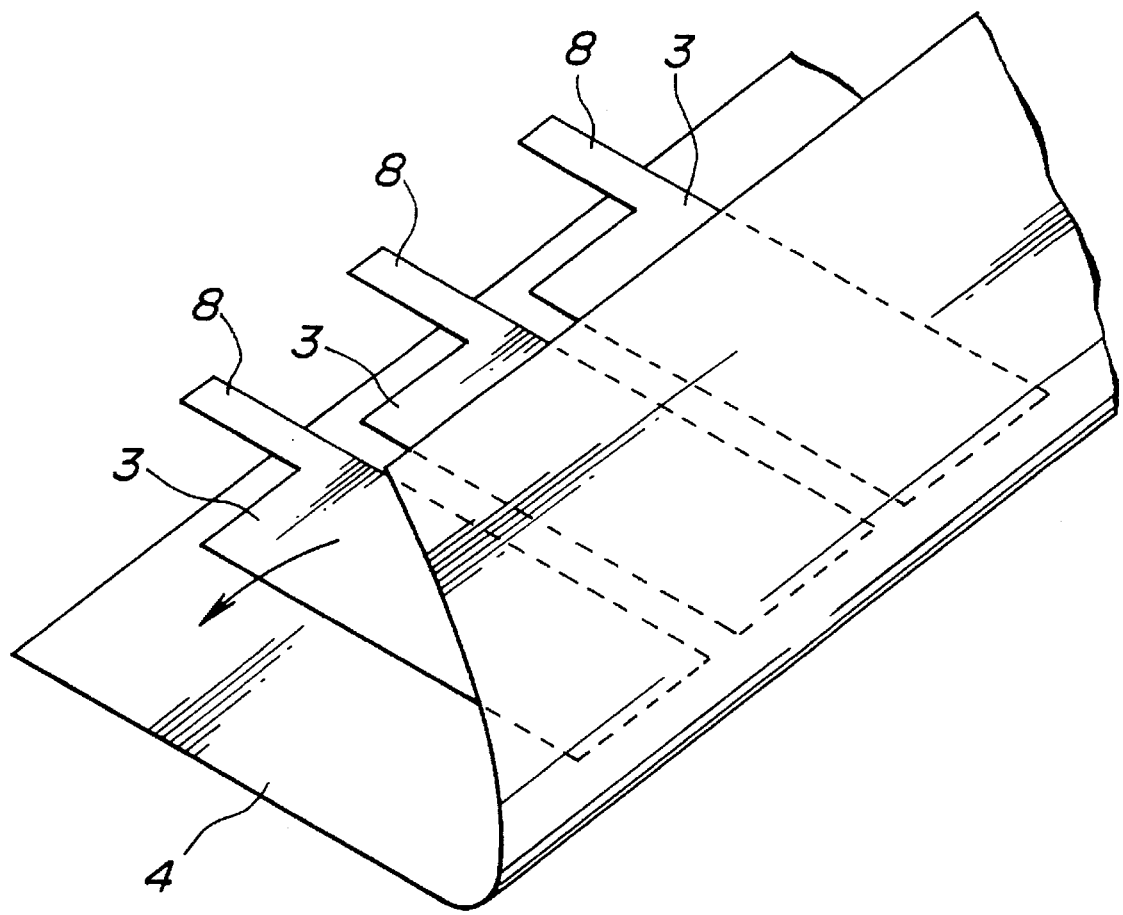
FIG. 16 is a perspective view showing an example of packing the cathode plates with one separator, in which the cathode plates are packed with the wide separator.

In the above embodiment, the cathode plates 3 are sandwiched by the two separators 4. However, the cathode plates 3 may be arrayed at predetermined intervals on a wide separator 4, as shown in FIG. 15, and may be sandwiched by double-folding the separator 4, as shown in FIG. 16.

Embodiment 2

Figure 17:
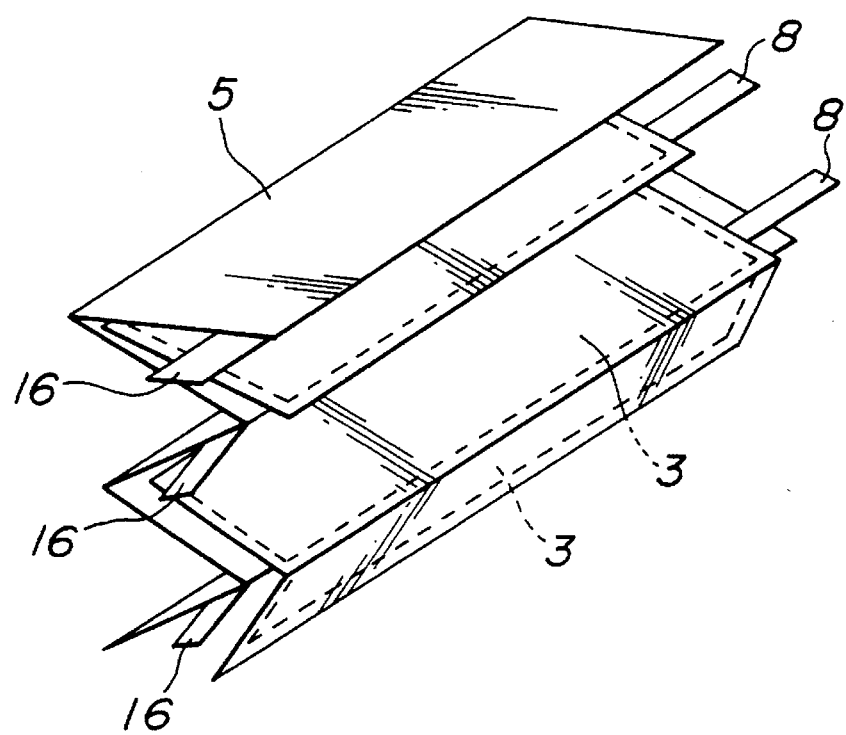
FIG. 17 is a perspective view showing a state prior to folding of an electrode group in a rectangular battery of Embodiment 2.
Figure 18:
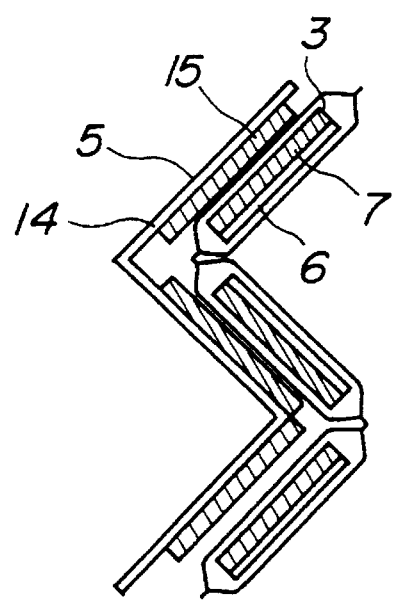
FIG. 18 is a cross-sectional view showing the state prior to the folding of the electrode group in the rectangular battery of Embodiment 2.

In Embodiment 2, a band-shaped anode plate 5 having no separator is formed in accordion form, and is folded alternately with a hoop-like cathode plates 3 having one side coated as in Embodiment 1 and packed with a separator 4, as shown in FIGS. 17 and 18.

In the present embodiment, since the anode plate 5 is in the continuous accordion shape, it exhibits satisfactory handling property and ease of fabrication, in comparison to Embodiment 1.

Embodiment 3

Figure 19:
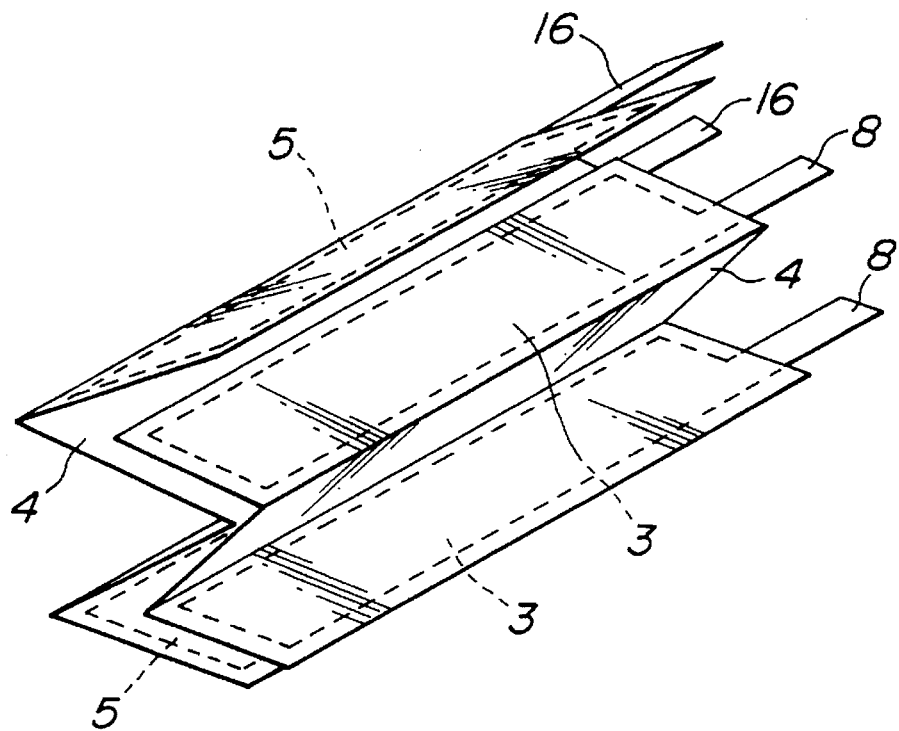
FIG. 19 is a perspective view showing a state prior to folding of an electrode group in a rectangular battery of Embodiment 3.
Figure 20:
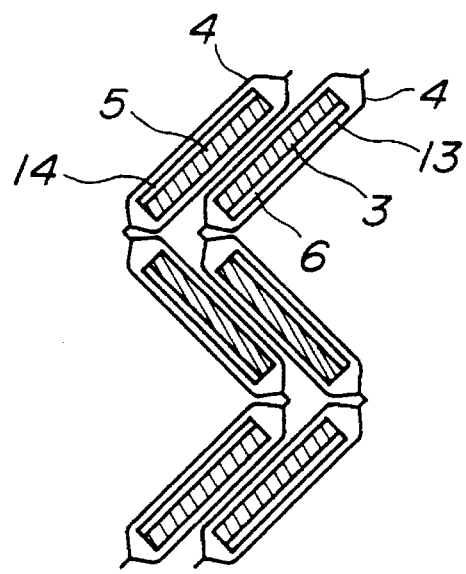
FIG. 20 is a cross-sectional view showing the prior to the folding of the electrode group in the rectangular battery of Embodiment 3.

In Embodiment 3, cathode plates 3 and anode plates 5 both having one side coated are packed with separators 4, respectively, and are alternately folded, as shown in FIGS. 19 and 20.

With such a structure, a short circuit of the cathode plates 3 and the anode plates 5 can be assuredly prevented, and reliability of the battery can be significantly improved. Also, fabrication is easier than in the electrode plates which are separated and alternately stacked.

As is apparent from the above description, in the rectangular battery of the present invention, at least each of the cathode plates or the anode plates is packed with the separator, and the bonding portion is bonded by the ultrasonic bonding. Therefore, deterioration in performance due to the intrusion of powder of the cathode plate and the anode plate into each other can be prevented, and an increase in battery capacity can be achieved by narrowing the bonding width.

In addition, in the rectangular battery of the present invention, the separator fusing portion between the electrode plates is processed to be extremely thin by the ultrasonic bonding. Therefore, the electrode plates can be easily separated simply by stretching the separator.

What is claimed:

1. A rectangular battery comprising: "a plurality of interleaving consecutively enveloped but separate cathode plates and anode plates;".

each of the cathode plates and anode plates having a lead;

the cathode plates and the anode plates each being respectively consecutively arranged and enveloped by two sheet separators, the two sheet separators for the cathode plates and the two sheet separators for the anode plates fused along opposite lengthwise lines between adjacent enveloped cathode plates and anode plates, the sheet separators for both cathode and anode plates being folded along said lengthwise lines between the consecutively arranged cathode plates and anode plates, the sheet separators for the cathode plates and the anode plates thus folded being interleaved together.

2. The rectangular battery as claimed in claim 1, wherein the sheet separators for the cathode plates are also sealed along opposite widthwise lines between said lengthwise lines except for said leads.

3. The rectangular battery as claimed in claim 2, wherein the sheet separators for the anode plates are also sealed alone opposite widthwise lines between said lengthwise lines except for said leads.

4. The rectangular battery as claimed in claim 1, wherein the plurality of cathode plates are sandwiched by a sheet separator having a width at least equal to twice the height of the cathode plates and folded over to sandwich the cathode plates.

5. The rectangular battery as claimed in claim 1, wherein the fusing portion is bonded by ultrasonic bonding.

6. The rectangular battery as claimed in claim 1, wherein the fusing portion is bonded by ultrasonic bonding at 40 kHz, 15 W.

7. The rectangular battery as claimed in claim 1, wherein the cathode plate is formed by an aluminum foil having both or one side thereof coated with a mixed cathode agent composed of an active cathode agent, a conductive agent and a binder, and dried.

8. The rectangular battery as claimed in claim 1, wherein the anode plate is formed by a copper foil having both or one side thereof coated with a mixed anode agent composed of an active anode agent and a binder, and dried.

9. The rectangular battery as claimed in claim 1, wherein the separator is composed of a polymeric material having pores.

10. The rectangular battery as claimed in claim 9, wherein the polymeric material is selected from the group consisting of polypropylene and polyethylene.

11. The rectangular battery as claimed in claim 1, wherein the sheet separators for the anode plates are also sealed along opposite widthwise lines between said lengthwise lines except for said leads.

12. The rectangular battery as claimed in claim 1, wherein the plurality of anode plates are sandwiched by a sheet separator having a width at least equal to twice the height of the anode plates and folded over to sandwich the anode plates.

* * * * *